US008245205B2

(12) United States Patent
Mariani et al.

(10) Patent No.: US 8,245,205 B2
(45) Date of Patent: Aug. 14, 2012

(54) SYSTEM AND METHOD FOR SHARING OBJECTS BETWEEN APPLICATIONS IN A VIRTUAL RUNTIME ENVIRONMENT

(75) Inventors: Rico Mariani, Kirkland, WA (US); Christopher W. Brumme, Mercer Island, WA (US); Patrick H. Dussud, Redmond, WA (US); Sean E. Trowbridge, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 107 days.

(21) Appl. No.: 12/623,338

(22) Filed: Nov. 20, 2009

(65) Prior Publication Data

US 2010/0070957 A1  Mar. 18, 2010

Related U.S. Application Data

(63) Continuation of application No. 10/967,607, filed on Oct. 18, 2004, now Pat. No. 7,665,077.

(51) Int. Cl.
*G06F 9/45* (2006.01)
(52) U.S. Cl. ....................................................... 717/140
(58) Field of Classification Search .................. 717/140, 717/141, 146, 147
See application file for complete search history.

(56) References Cited

U.S. PATENT DOCUMENTS

| | | | |
|---|---|---|---|
| 4,754,398 A | 6/1988 | Pribnow | |
| 4,901,230 A | 2/1990 | Chen et al. | |
| 6,029,206 A * | 2/2000 | Endicott et al. | 719/315 |
| 6,052,528 A | 4/2000 | Dechamboux | |
| 6,059,838 A * | 5/2000 | Fraley et al. | 717/108 |
| 6,125,366 A * | 9/2000 | Bernstein et al. | 1/1 |
| 6,133,917 A * | 10/2000 | Feigner et al. | 715/708 |
| 6,199,197 B1 | 3/2001 | Engstrom et al. | |
| 6,347,398 B1 * | 2/2002 | Parthasarathy et al. | 717/178 |
| 6,519,594 B1 | 2/2003 | Li | |
| 6,874,066 B2 | 3/2005 | Traversat et al. | |
| 6,915,510 B1 * | 7/2005 | Tock et al. | 717/165 |
| 7,246,135 B2 | 7/2007 | Reid | |
| 7,380,039 B2 | 5/2008 | Miloushev et al. | |
| 7,426,565 B1 | 9/2008 | Tormasov et al. | |
| 2002/0010849 A1 * | 1/2002 | Liu | 712/43 |
| 2002/0057283 A1 * | 5/2002 | Biswas et al. | 345/700 |
| 2002/0087738 A1 | 7/2002 | Nagano et al. | |

(Continued)

OTHER PUBLICATIONS

Bansal, "Shared Objects for the Object Disoriented!", retrieved on Aug. 24, 2009 at <<http://www.ibm.com/developernetworks/library/l-shobj/>>, Apr. 1, 2001, pp. 1-7.

*Primary Examiner* — Anna Deng
(74) *Attorney, Agent, or Firm* — Lee & Hayes, PLLC (57) ABSTRACT

The techniques and mechanisms described herein are directed at sharing objects between applications executing in a virtual runtime environment. The techniques include compiling a cpu-independent file to create executable instructions that are associated with an application that is executable in a virtual runtime environment. A constructor associated with a shareable class defined within the cpu-independent file is executed to create an instance of a shareable object. The shareable object is then persisted in a manner such that other applications executing in the virtual runtime environment may access the shareable object. The technique may be performed during pre-JIT compilation or just-in-time compilation of the cpu-independent file. The execution of the constructor is performed at a restricted security level that prevents access to changeable information when generating static data for the static members of the shareable object.

20 Claims, 8 Drawing Sheets

U.S. PATENT DOCUMENTS

| | | |
|---|---|---|
| 2002/0087744 A1* | 7/2002 | Kitchin ........................ 709/331 |
| 2003/0126187 A1 | 7/2003 | Won et al. |
| 2003/0167270 A1* | 9/2003 | Werme et al. .................. 707/10 |
| 2003/0177480 A1 | 9/2003 | Arkwright et al. |
| 2004/0034621 A1 | 2/2004 | Tanaka et al. |
| 2004/0098731 A1 | 5/2004 | Demsey et al. |
| 2004/0205375 A1 | 10/2004 | Osawa |
| 2004/0230958 A1 | 11/2004 | Alaluf |
| 2005/0097534 A1 | 5/2005 | Clement et al. |
| 2005/0102670 A1 | 5/2005 | Bretl et al. |
| 2006/0059156 A1 | 3/2006 | Janes et al. |
| 2006/0070051 A1 | 3/2006 | Kuck et al. |
| 2008/0059471 A1* | 3/2008 | Loaiza et al. ..................... 707/8 |
| 2008/0066081 A1 | 3/2008 | Monnie et al. |

* cited by examiner

SYSTEM AND METHOD FOR SHARING OBJECTS BETWEEN APPLICATIONS IN A VIRTUAL RUNTIME ENVIRONMENT

RELATED APPLICATIONS

This application is a Continuation application of application Ser. No. 10/967,607, which has a filing date of Oct. 18, 2004. The entire contents of application Ser. No. 10/967,607 are hereby incorporated herein by reference.

BACKGROUND

A recent software development allows applications to be easily implemented on various types of computer systems that have different processors. This is achieved by executing the applications within a virtual runtime environment. In one environment, source code may be written using one of several computer languages, such as C#. The source code is then compiled into an intermediate language assembly. An application created using one or more of the intermediate language assemblies is referred to as a "managed" application. In order for the managed application to execute on a particular computer system, its associated intermediate language (IL) assemblies undergo further processing.

This additional processing may be performed using one of several different techniques. One technique, commonly referred to as Just-In-Time (JIT) compilation, performs the conversion of the IL assemblies into the executable code during runtime. Another technique, commonly referred to as pre-JIT compilation, performs the conversion of the IL assemblies into the executable code before runtime. The pre-JIT compilation converts the IL assemblies into a native image that is specific to the processor on which the managed application will run. Thus, the native image contains instructions that are ready for execution. While the JIT compilation and the pre-JIT compilation produce equivalent executable instructions, the pre-JIT compilation provides faster execution because the instructions are ready for execution once the native image is loaded.

The pre-JIT technique is similar to the traditional build procedure for creating binaries. In the traditional build procedure, source code is compiled into an object file for a specific processor or operating environment. Thus, for each different computer environment/processor, the traditional source code is re-compiled for that particular environment/processor. One or more object files may then be linked to make the executable binary. The creation of the executable binaries for each type of computer environment/processor is typically performed in a build lab. The different binaries are then distributed to the computers based on their environment/processor. While this works, this traditional build procedure makes it difficult to distribute code over a diverse network, such as the Internet.

The above-mentioned intermediate language assemblies do not have this distribution problem. The same IL assembly can be distributed to different computer environments/processors. Even though the pre-JIT technique creates a native image particular to one computer environment/processor, the pre-JIT technique still preserves the mobility aspect because the pre-JIT technique is performed by the target computer.

However, traditional applications created using the traditional build process offer advantages not available to managed applications, namely the ability to share data and have constant data. In traditional applications, constant data sections are utilized which are shareable to all running copies of a program or library. The constant data sections are initialized at compilation time. Thus, once the constant data is read from disk, disk cache, or the like, the constant data is available for all the running copies of the program or library.

Unfortunately, managed applications can not embed constant data into their executables or share data between managed applications. Instead, managed applications create the necessary constant data structures when the managed application is first loaded for execution. The constant data structures, along with all the other data for the managed application, are placed on the memory heap so that a garbage collection process can manage the memory for that particular managed application.

Thus, until now, there has not been a satisfactory solution for sharing objects between applications executing in a virtual runtime environment.

SUMMARY

The techniques and mechanisms described herein are directed at sharing objects between applications executing in a virtual runtime environment. The applications may be in the same process or in different processes. The techniques include compiling a cpu-independent file to create executable instructions that are associated with an application that is executable in a virtual runtime environment. A constructor associated with a shareable class defined within the cpu-independent file is executed to create at least one shareable object. The shareable objects are then persisted in a manner such that other applications executing in the virtual runtime environment may access the shareable object. The technique may be performed during just-in-time (JIT) compilation or pre-JIT compilation of the cpu-independent file. The execution of the constructor is performed at a restricted security level that prevents access to changeable information when generating static data for the static members of the shareable object.

BRIEF DESCRIPTION OF THE DRAWINGS

Non-limiting and non-exhaustive embodiments are described with reference to the following figures, wherein like reference numerals refer to like parts throughout the various figures unless otherwise specified.

DETAILED DESCRIPTION

Briefly, the present system and method allows applications executing in a virtual runtime environment the ability to share data and utilize constant data. This is achieved by executing a constructor associated with a shareable object at IL compilation time and storing information about the shareable object in a manner such that other applications may utilize the shareable object. As will be described in detail below, not only does the present shareable data mechanism provides shareable data between applications, but also provides faster execution of the application. These and other advantages will become clear after reading the following detailed description.

Exemplary Computing Environment

Figure 1:
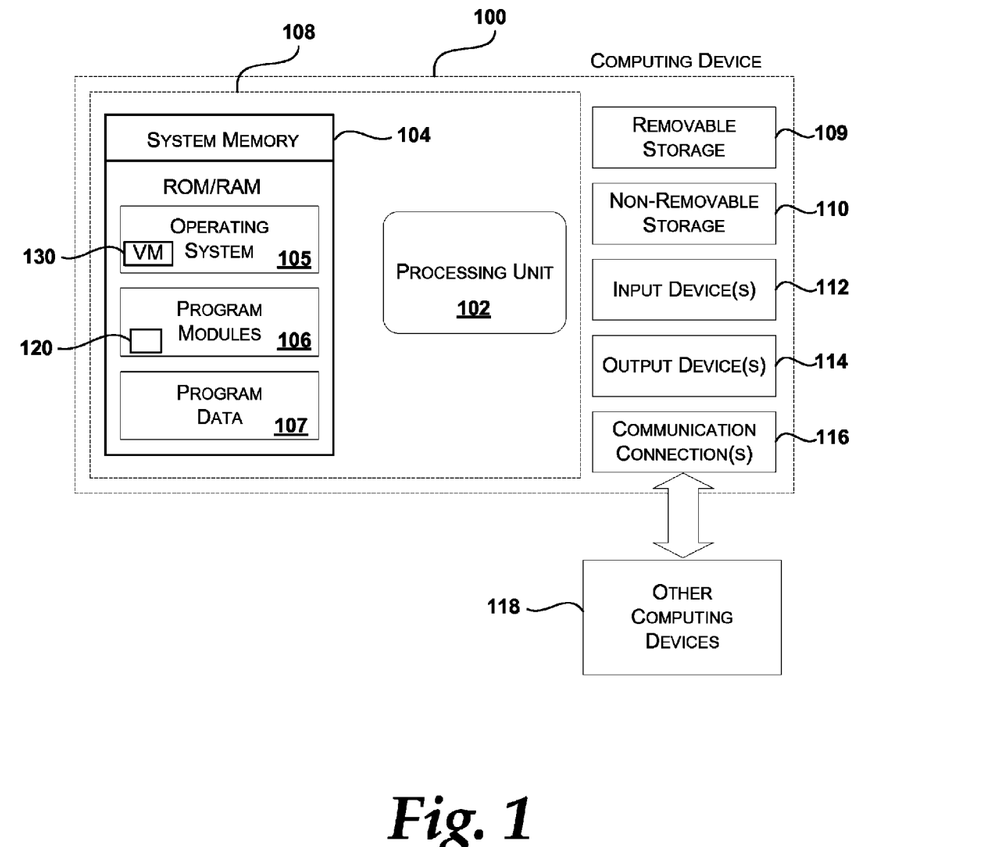
FIG. 1 is an illustrative operating environment suitable for implementing the techniques and mechanisms described herein.

The various embodiments of the present shareable data mechanism may be implemented in different computer environments. The computer environment shown in FIG. 1 is only one example of a computer environment and is not intended to suggest any limitation as to the scope of use or functionality of the computer and network architectures. Neither should the computer environment be interpreted as having any dependency or requirement relating to any one or combination of components illustrated in the example computer environment.

With reference to FIG. 1, one exemplary system for implementing the present system and method for sharing instances of objects includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. Program modules 106 may also include one or more applications 120 operable in a virtual runtime environment. Hereinafter, the following discussion refers to application 120 as a "managed" application. Managed application 120 refers to code that is written in an intermediate language (CPU-independent code) that needs to be compiled into native code before execution of the application. In addition, memory 104 further stores a virtual machine 130. Virtual machine 130 is responsible for processing managed applications 120. While different virtual runtime environments may implement the virtual machine 130 in various ways to attain CPU-independent properties, the present shareable data mechanism is suited to operate in each of the various virtual runtime environments. The virtual machine 130 may be part of the operating system 105 (as shown in FIG. 1), one of the program modules 106, or layered on top of the operating system 105. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connection(s) 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

Creation of Shareable Data for Managed Applications

Figure 2:
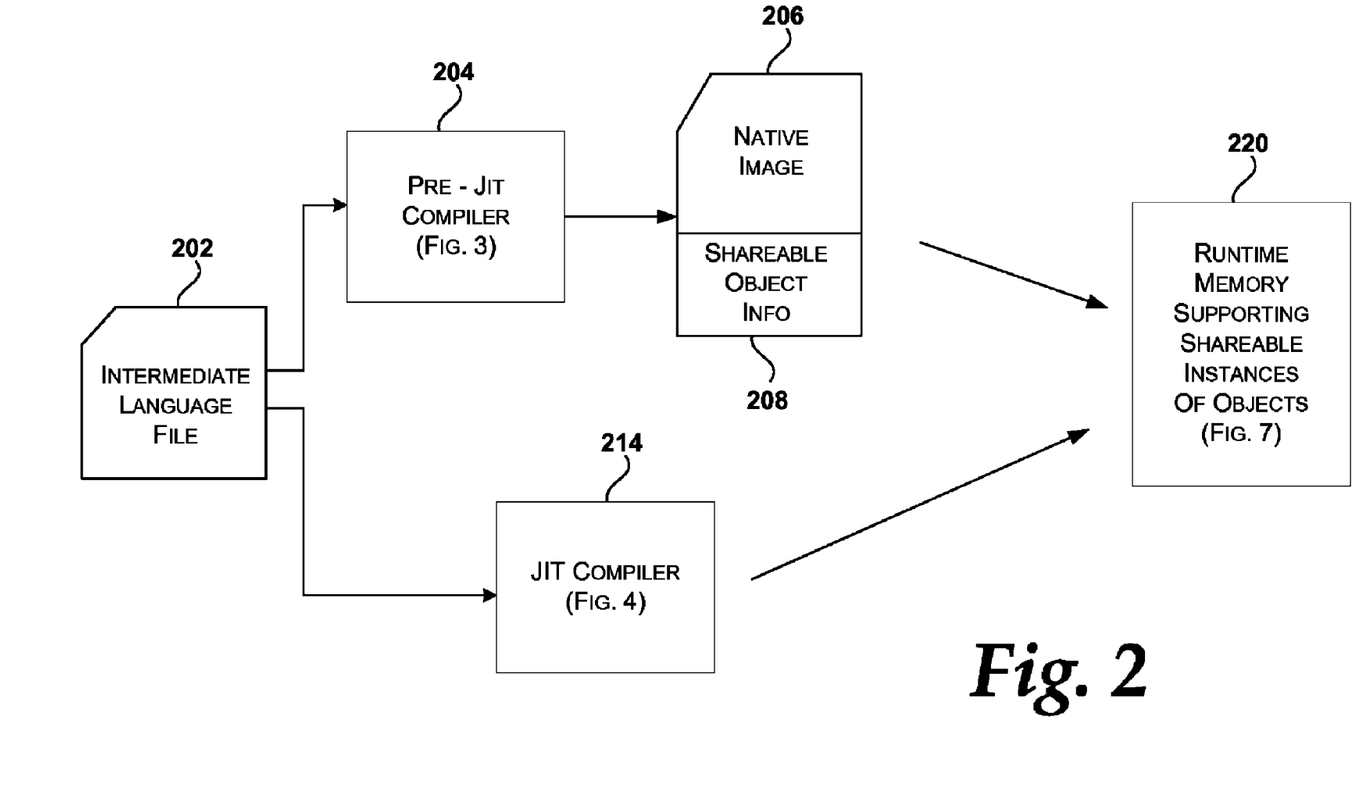
FIG. 2 is a block diagram illustrating an overview of the flow for creating executable instructions and shareable data for a managed application in accordance with the present shareable data mechanism.

FIG. 2 is a block diagram illustrating an overview of the flow for creating executable instructions and shareable data for a managed application in accordance with the present shareable data mechanism. As mentioned above, there are two general techniques for creating the executable instructions. One technique inputs an IL file 202 into a pre-JIT compiler 204 that pre-compiles portions of the IL file 202 to create a native image 206. Briefly, described in detail below in conjunction with FIG. 3, the pre-JIT compiler 204 utilizes the present shareable data mechanism when performing the additional processing to create shareable object information 208. The shareable object information 208 is stored in association with the native image 206. In one embodiment, the native image 206 and the shareable object information are stored together in the same file. In another embodiment, the file storing the native image 206 may include a reference to another file in which the shareable object information is stored. These and other variations are envisioned and do not depart from the scope of the present shareable data mechanism described herein. With any of the various embodiments, during runtime, the native image and the shareable object information are loaded, the shareable object information 208 is then organized within the runtime memory in a manner that supports shareable data among managed applications. In one embodiment, the shareable object information that is stored in association with the native image represents a memory mapped version of each shareable object. An overview of salient portions of the runtime memory supporting shareable data is described later in detail in conjunction with FIG. 7. The shareable data is then accessible to multiple managed applications executing in different application domains within the same process or within different processes.

Figure 8:
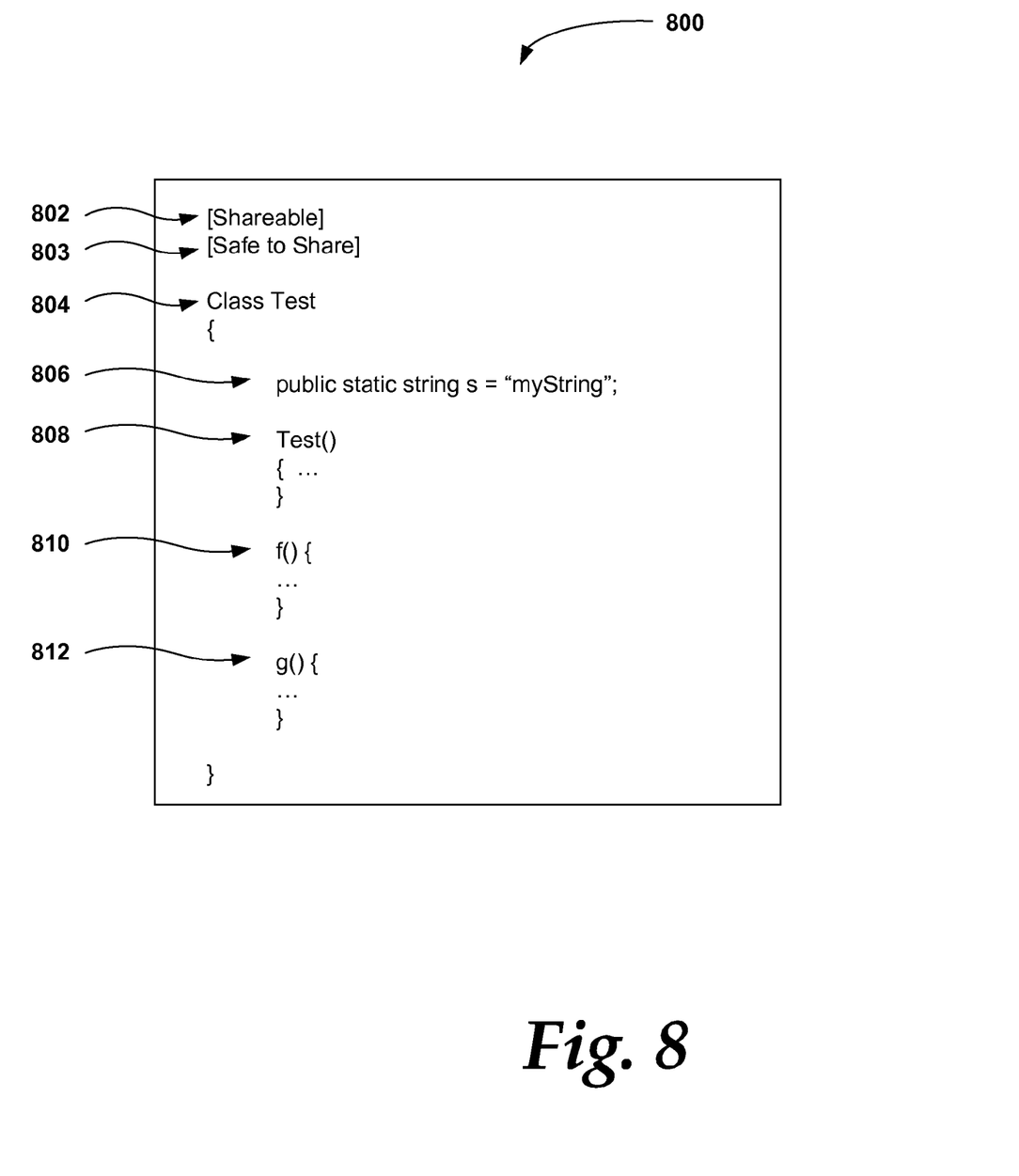
FIG. 8 is illustrative pseudo-code of a portion of source code depicting a class associated with an attribute that signals the creation of a shareable object to the compilation processes illustrated in FIG. 3 and FIG. 4.

Another technique for creating executable instructions inputs the IL file 202 into a JIT compiler 214 during runtime. The JIT compiler 214 then utilizes the present shareable data mechanism to support shareable data at runtime. As illustrated in FIG. 2, the output of either technique results in executable instructions and shareable data with runtime memory 220. The present shareable data mechanism operates to create shareable objects from classes defined using a class declaration (example in FIG. 8) and from classes generated dynamically via reflection.

Figure 3:
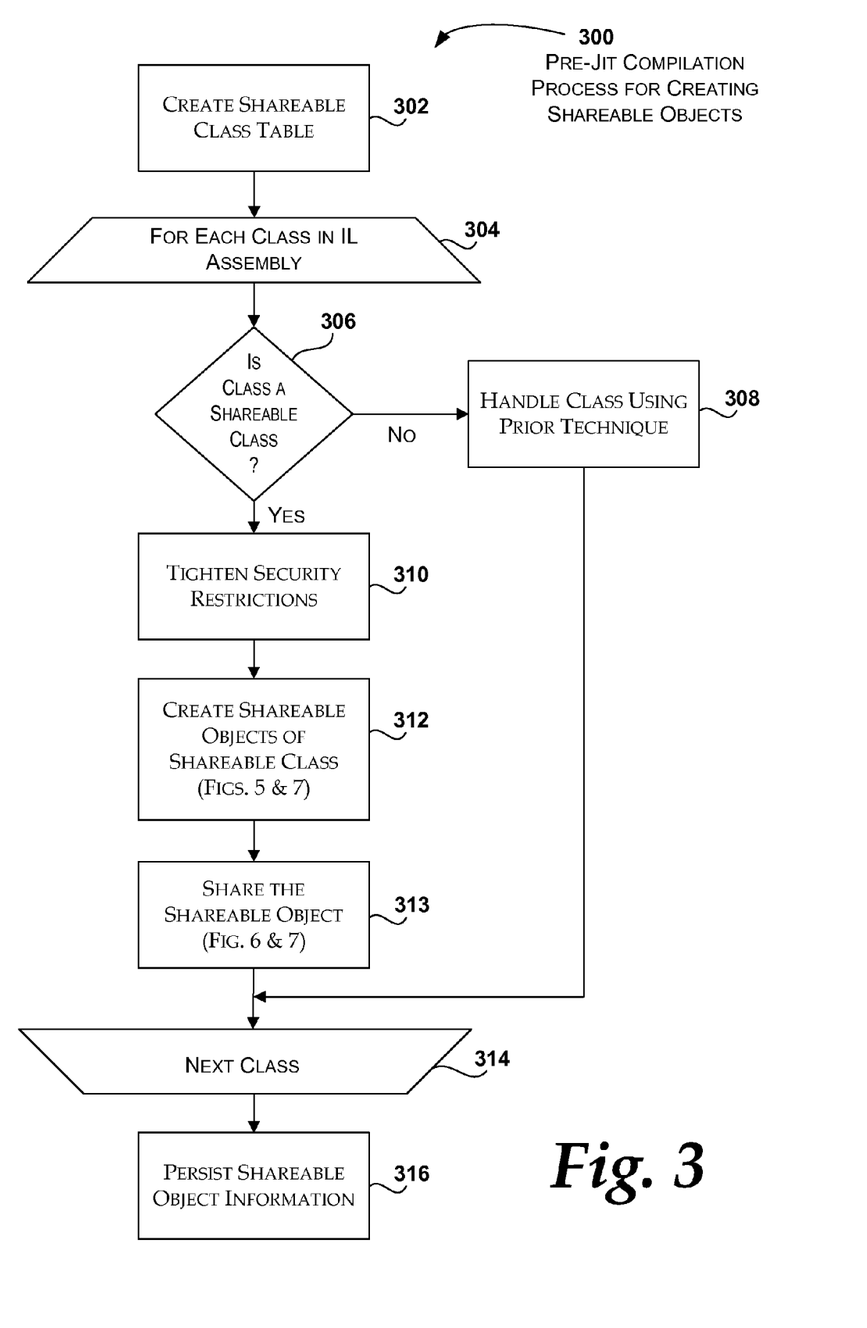
FIG. 3 is a flow diagram illustrating a pre-JIT compilation process implemented by the pre-JIT compiler shown in FIG. 2.

FIG. 3 is a flow diagram illustrating a pre-JIT compilation process 300 suitable for implementation by the pre-JIT compiler shown in FIG. 2. In order to better understand the pre-JIT compilation process 300, process 300 is described in conjunction with FIG. 7, as needed, in order to provide a visual depiction of salient portions of memory that support the creation of shareable data. In overview, process 300 ensures that a class that is marked as shareable meets certain security conditions and that the shareable objects created from the shareable class are 'safe to share'. Process 300 begins at block 302.

Figure 7:
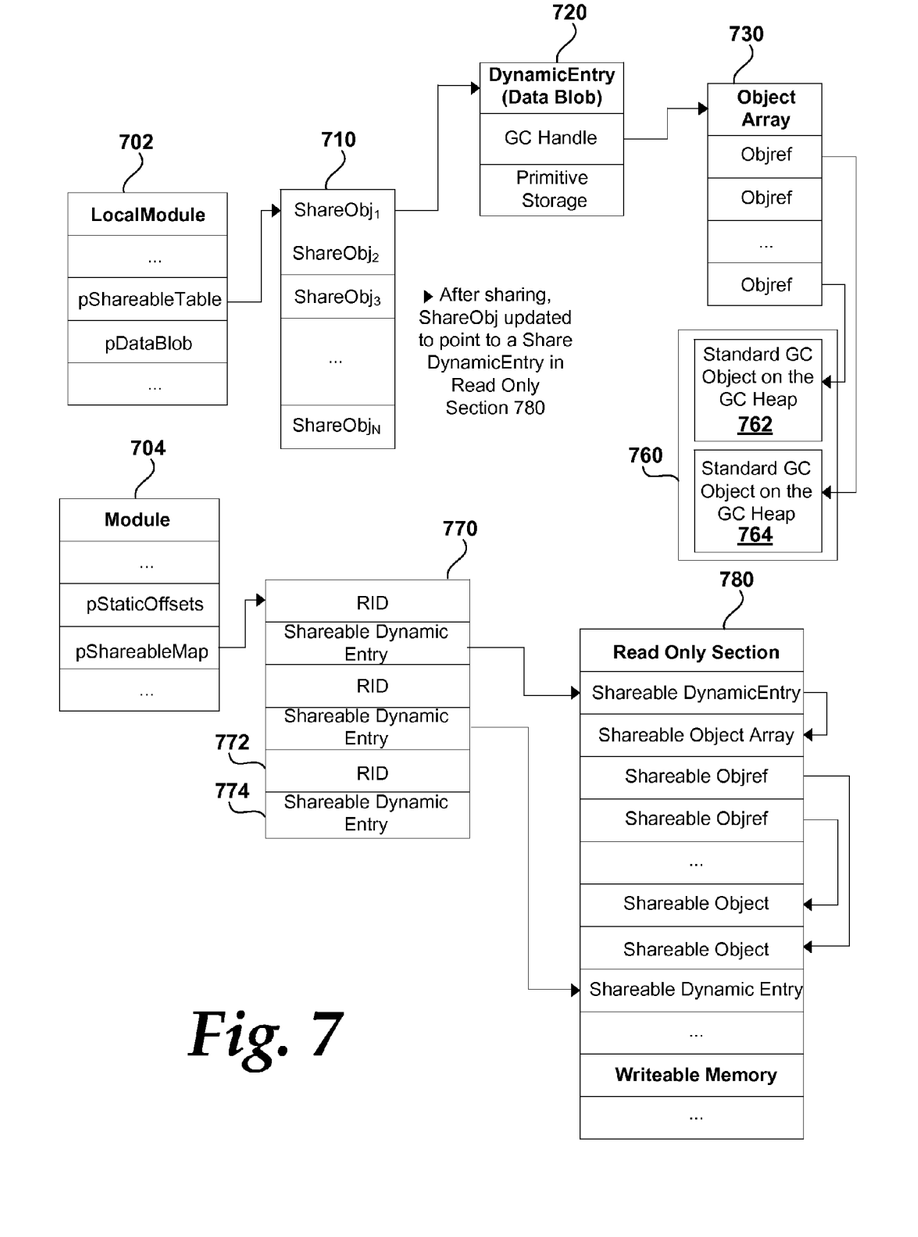
FIG. 7 is a graphical depiction of salient portions of memory for creating shareable objects in accordance with the present shareable data mechanism.

At block 302, a shareable class table is created (shareable class table 710 in FIG. 7). When the IL module (assembly) is loaded, the module is interrogated to determine how many shareable classes are identified within the module. The shareable class table is then created based on the number of shareable classes identified. In one embodiment, each class identified within the module is assigned a consecutive increasing number. The shareable class table includes the numbers assigned to the shareable classes. Thus, the shareable table then includes an entry for each of the identified shareable classes using its consecutive number as an index. The value for each entry in the shareable class table is set to null to indicate that the entry is not currently associated with a shareable object on the heap. A pointer to the shareable class table (e.g., pShareableTable) is stored by the local module (see local module pointer table 700). The shareable class table stores references to each of the shareable objects created by the module. As will be described, each shareable object is treated individually. This allows the constructors for the shareable classes to be run on an as-needed basis in the JIT compilation process rather than forcing each of the constructors to be executed together as in the pre-JIT compilation process.

During "for loop" 304-314, the CPU-independent assembly is walked through to identify each class. Once a class is identified, processing continues at decision block 306. At decision block 306, a determination is made whether the class is a shareable class. This determination is performed in a similar manner as the determination for identifying the total number of shareable classes within the assembly as performed in block 302. In general, the determination is based on whether the class is associated with a shareable attribute. Briefly, turning to FIG. 8, pseudo-code for a shareable class is illustrated. For example, the exemplary shareable class 804 includes a member 806, a constructor 808, and two functions 810 and 812. In the illustrated shareable class, member 806 is a static string s. Before the member may be utilized, the constructor 808 is executed to create an instance of the class. In prior virtual runtime environments, the constructor 808 is executed each time the class is loaded and an instance of the class is created. Thus, for each application domain, an identical copy of the object is placed on the heap and the constructor 808 is called each time. In contrast, even though the shareable class is declared in its usual manner, the present shareable data mechanism processes the shareable class in a different manner and at a different time than its usual manner. In addition, the shareable class 804 includes annotation, such as an attribute 802 (e.g., "[Shareable]") that identifies the class as a shareable class. One skilled in the art will appreciate that the attribute 802 may take various forms and may have various textual strings without departing from the present shareable data mechanism. While the above pseudo-code illustrates a relatively simplistic shareable object, one skilled in the art will appreciate that any arbitrarily complex object may be designated as a shareable object. In addition, the constructor 808 may perform complicated initializations in order to obtain the information for the shareable object. Indeed, the more complicated the initialization, the greater the benefit of the present shareable data mechanism. For example, if a shareable class has a constructor that creates a shareable object storing the first 1000 prime numbers, the calculation of the first 1000 prime numbers would only have to be run once. Each subsequent access to this shareable class could directly obtain the data without executing the constructor. These subsequent accesses may occur years after the creation of the shareable object.

At decision block 306, if the process concludes that the class is not a shareable class, processing continues at block 308 where the class is handled using the prior pre-JIT compilation technique which results in the executable instructions that are saved in the native image. If, however, the process concludes that the class is a shareable class, processing continues at block 310. In this embodiment, the default for a class is that it is not shareable. Shareable classes may include collections, hash tables, primitives, and the like.

At block 310, security restrictions are tightened. The normal security for processing IL in either the pre-JIT or the JIT compiler is at the security level assigned to the user initiating the processing of the IL. For example, in prior techniques, if a system administrator initiates processing, the pre-JIT compilation or the JIT compilation is performed at the system administrator privilege level and with the managed security system running in a fully-trusted mode. However, in accordance with the present shareable data mechanism, the privileges of any user are reduced when executing a class constructor designated as shareable, preferably utilizing industry standard code access security techniques. The reduced privileges preferably reflect zero or near zero security clearance. Thus, during execution of the class constructor, any demand for any service fails. For example, any operation requiring even minimal privileges, such as access to a network, database, file, registry, environment, native code, and the like, will result in an exception, and thus, not be allowed. If security conditions prevent the running of the code, the processing of the IL may stop and any subsequently designated classes that are marked as shareable may not be processed. In another embodiment, the current class may be omitted and the subsequent shareable classes may be processed. In another embodiment, the shareable attribute may be ignored and the class processed as if it was not marked as shareable. For any embodiment, it is desirable to provide immediate feedback to the programmer regarding the error so that the error can be resolved to ensure proper execution of the managed application.

By tightening security, the types of objects that can be shareable are controlled. Preventing access to the execution environment via security serves a dual role. First, it defends against malicious code. Secondly, it prevents the sharing of objects that are sensitive to the environment and which, therefore, should not be shared. Processing continues at block 312.

At block 312, the shareable objects associated with the shareable class are created in accordance with the present shareable data mechanism. The process for creating shareable objects is described later in conjunction with FIG. 5 and FIG. 7. Processing continues at block 313.

At block 313, the shareable objects are made shareable to other managed applications. Before block 313, the shareable objects are considered first class objects and are modifiable. After block 313, the shareable objects are no longer modifiable. Briefly, described below in detail in conjunction with FIG. 6 and FIG. 7, the data structures created for the shareable objects are copied to a read-only memory and references to these data structures are modified to reflect the new read-only memory location. Processing continues to end loop 314 and proceeds as described above for each class identified within the cpu-independent assembly. Once the "for loop" is complete, processing continues to block 316.

At block 316, the shareable object information is saved in conjunction with the native image file. As mentioned above, the shareable object information may be saved in the same file with the native image or in another file associated with the native image. The shareable object information that is saved is described in more detail later in conjunction with FIG. 7. Processing is then complete.

Figure 4:
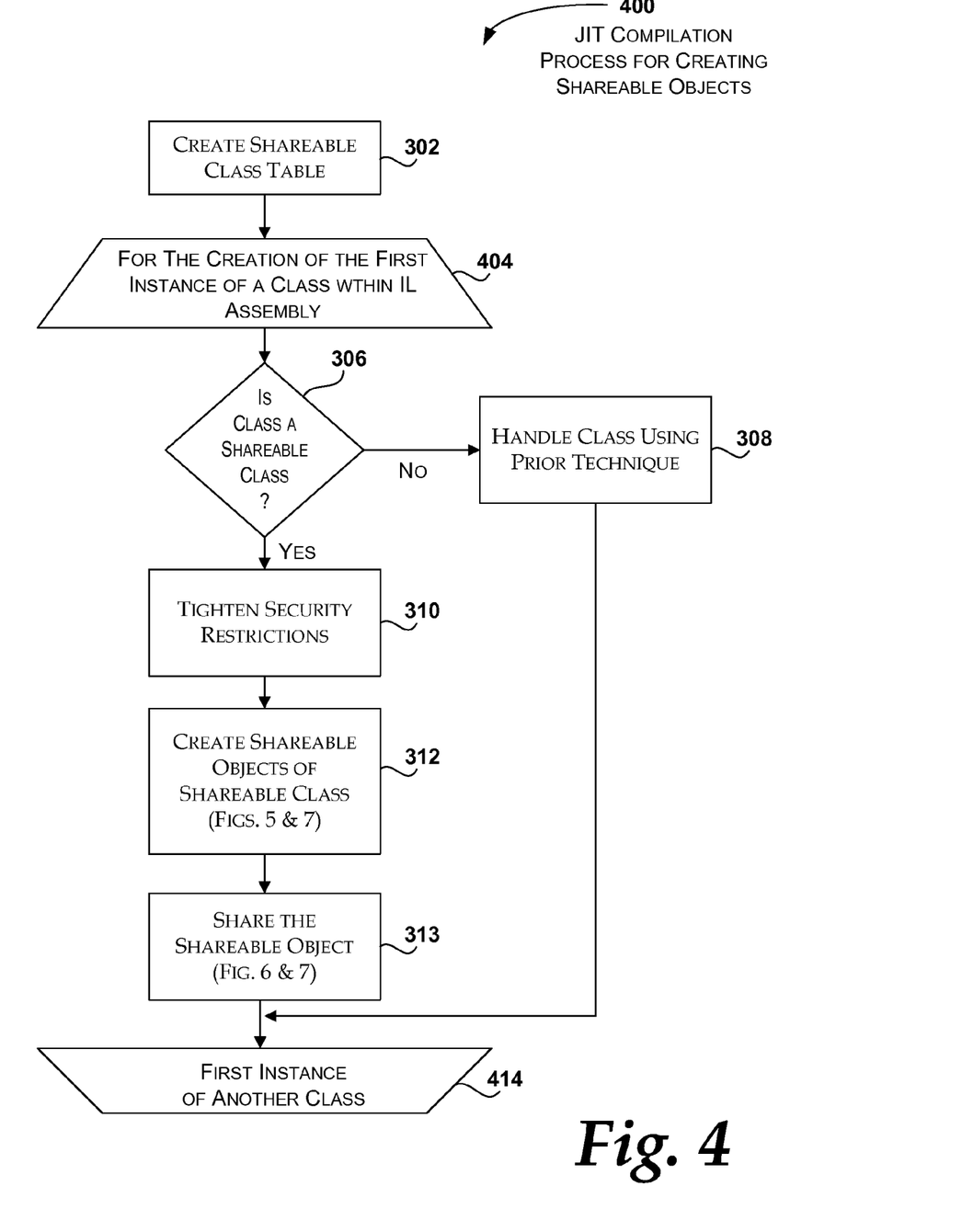
FIG. 4 is a flow diagram illustrating a JIT compilation process implemented by the JIT compiler shown in FIG. 2.

FIG. 4 is a flow diagram illustrating a JIT compilation process 400 implemented by the JIT compiler shown in FIG. 2. As mentioned above, while the executable instructions generated by the pre-JIT compilation and the JIT compilation are equivalent, the timing for generating the executable instruction is different. Therefore, the processing performed in many of the blocks illustrated within FIG. 4 perform the same processing as described in the corresponding blocks of FIG. 3. For convenience, the blocks in FIG. 4 that perform the same processing as a corresponding block in FIG. 3 have the same reference number as the block in FIG. 3. These blocks will not be described again in detail. Thus, in overview, JIT compilation process 400 does not include block 316 and "for loop" 404-414 may operate slightly different than in the pre-JIT compilation process 300. These differences will now be described.

As mentioned above, the "for loop" 404 and 414 may operate slightly different in the JIT compilation process 400 in comparison with the pre-JIT compilation process 300. In the JIT compilation process, the IL assembly is not walked through to identify each class. Rather, when a class is requested for creation, the class is processed. Thus, each of the classes within the IL assembly may not necessarily get created or accessed. In another embodiment, the JIT compilation process 400 may operate similarly to the pre-JIT compilation process 300 and walk through each of the classes and create each of the shareable and non-shareable objects within the IL assembly.

Figure 5:
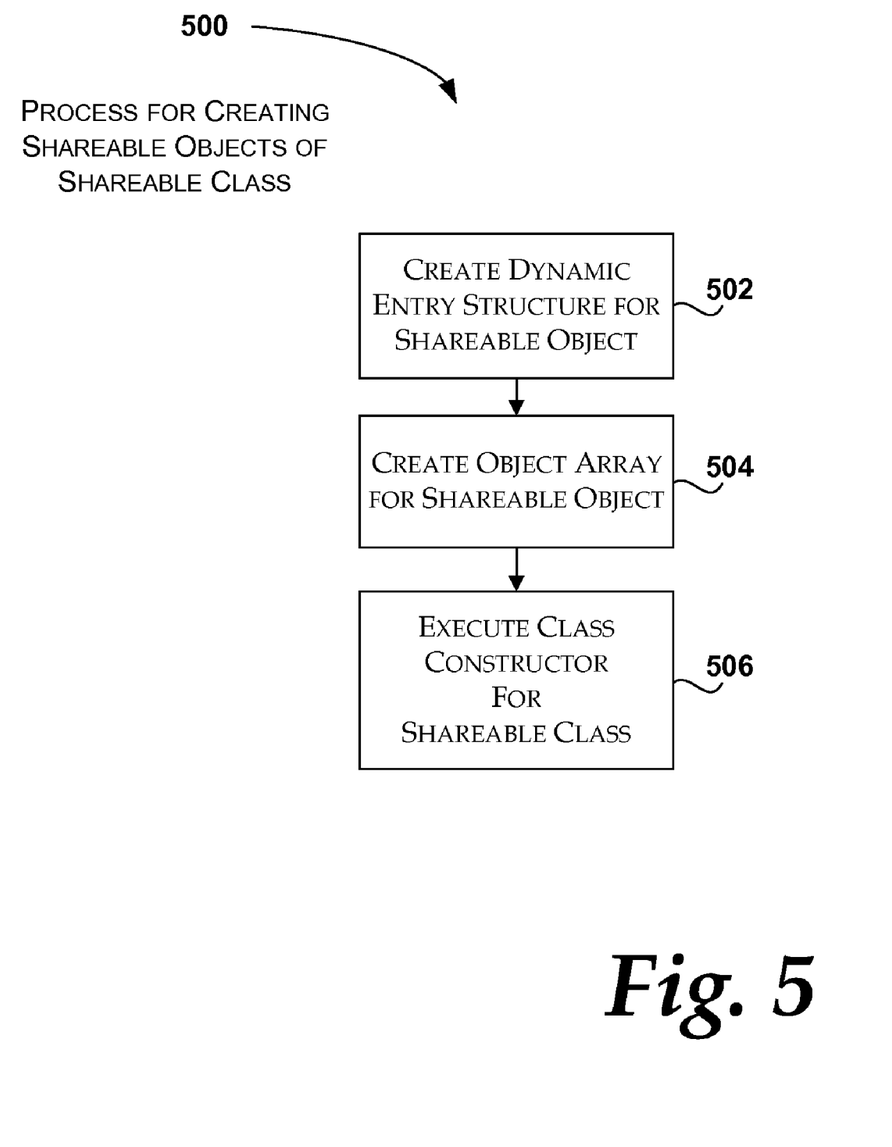
FIG. 5 is a flow diagram illustrating a process for executing a class constructor of a shareable class that is suitable for use in the flow diagrams illustrated in FIG. 3 and FIG. 4.

FIG. 5 is a flow diagram illustrating a process for creating shareable objects of the shareable class during the generation of executable instructions that is suitable for use in the flow diagrams illustrated in FIG. 3 and FIG. 4. Before describing process 500 in more detail, portions of FIG. 7 are described to help in the understanding of process 500.

In overview, data structures 710, 720, and data structure 730 are used for creating the shareable objects associated with a shareable class. These data structures are utilized during either the pre-JIT compilation process 300 or the JIT compilation process 400. The environment includes a general heap 760 in which data structures are allocated and managed by a garbage collection process. Data structure 770 and the contents of read-only memory 780 after the pre-JIT compilation process is included in the shareable object information that is persisted to a file. Each of the above data structures are created once per application domain, except for module lists 704, shareable map 770, and the read-only section 780. In addition, there is typically one instance of the general heap 760 that maintains copies of shareable objects for each application domain until they are copied to the read-only section 780.

Returning back to FIG. 5, process 500 begins at block 502 where a dynamic entry structure 720 is created for the shareable objects associated with the shareable class. The shareable object table is updated so that the entry corresponding to the shareable class points to the dynamic entry structure 720. Each dynamic entry data structure 720 includes a garbage collection handle and primitive storage. The primitive storage in the dynamic entry data structure 720 contains the non-garbage collectable static members, such as integers, floating point numbers, and the like. The garbage collection handle references an object array data structure 730 created in block 504. Processing continues at block 506.

At block 506, the class constructor for the shareable class is executed. The class constructor may be an implicit constructor or an explicit constructor. Of interest, code within the class constructor is executed during the creation of the native instructions (i.e., during the pre-JIT compilation or JIT compilation). In prior techniques, code of the application was not executed until runtime. The class constructor populates the entries in the dynamic entry data structure 720 and the object array data structure 730. The object array data structure 730 includes one object reference for each static member within the shareable class that is an object. The class constructor is responsible for placing these objects on the heap and updating each entry in the object array data structure 730 with a location for the object on the heap 760. A conventional garbage collector may be utilized to collect these objects and traverse these objects as required. The process for creating the shareable objects is then complete.

It should be noted, however, that the construction of one class may in turn trigger the construction of a second class. In this case, processing of the first class is paused while the next class is constructed. Processing of the second class may in turn be similarly interrupted and so forth. After each such interruption is complete, processing may resume on the previous class.

Figure 6:
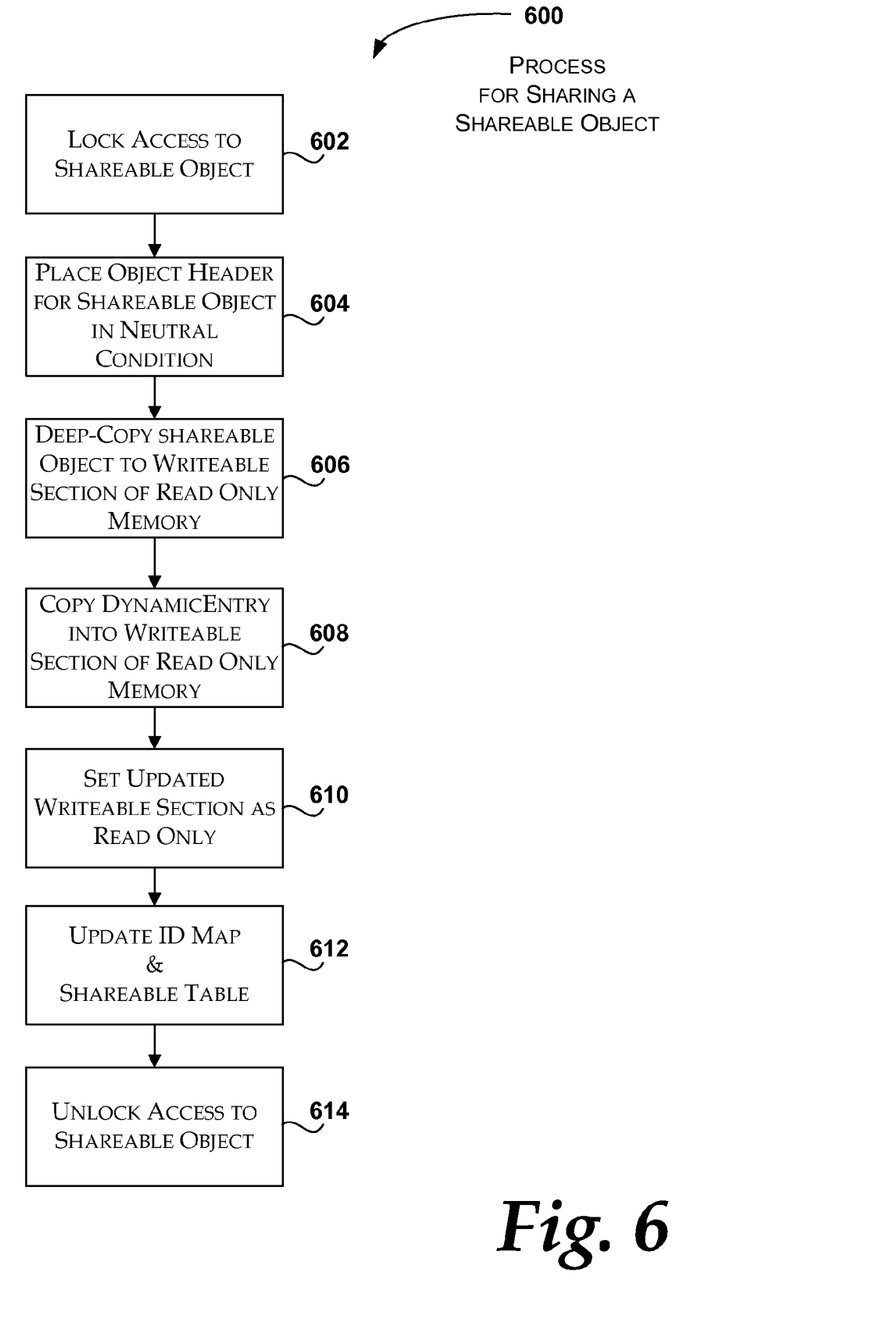
FIG. 6 is a flow diagram illustrating a process for sharing a shareable object suitable for use during the JIT conversion process illustrated in FIG. 4.

FIG. 6 is a flow diagram illustrating a process for sharing the shareable objects suitable for use during the JIT conversion process illustrated in FIG. 4. After process 600 is performed for a particular shareable class, the shareable objects are then available for access by other managed applications. At block 602, access to the shareable object information is locked. This may be achieved by pausing the running threads or otherwise blocking any thread when it attempts to write into the protected area, or another conveniently sized area that is larger than the protected area. This prevents the shareable object from being garbage collected, moved within the heap, or otherwise modified while the shareable object is copied to the read-only memory 780. Processing continues at block 604.

At block 604, the object header associated with the particular shareable object is placed in a neutral condition. For example, a lock state for the particular shareable object is set to a neutral condition because after the shareable object is moved to read only memory, the shareable object can not be modified. Thus, the lock/unlock state in the object header is not applicable to shareable objects. The hash code within the object header is another example of information that is placed in a neutral condition. If the hash value is already present, the hash value is copied as is. However, if the hash value is not present, a hash for the shareable object is created and stored in the hash value. In a further refinement, the hash value is only calculated for objects that use cached hash values. Processing continues at block 606.

At block 606, the shareable object on the heap is deep-copied to a writable portion of the read only memory 780. Deep copy refers to copying not only the object but also any other objects referenced by the object, in essence copying the object graph. However, before performing the deep-copy, the shareable objects are optionally inspected to ensure that each object is in fact a type that has been marked as 'safe to share'. This provides further protection and assistance to programmers so that they are less likely to attempt to share objects where such sharing would result in an error. Similar to annotating a class as shareable (FIG. 8), a class may be annotated as 'safe to share' (annotation 803 in FIG. 8). A class annotated with 'safe to share' has each of its non-static members suitable for use in shared objects. In the above described implementation, the 'safe to share' annotation is explicitly indicated and an unsafe class is assumed. Alternatively, classes may default to being 'safe to share' and unsafe classes are annotated with 'unsafe to share'. In either implementation, the object graph of a static data member of a shareable class may not include an 'unsafe to share' class and objects with these unsafe to share objects would result in an error. A class may include both the shareable annotation 802 and the 'safe to share' annotation 803. The properties are logically independent. In addition, the information within the object array 730 and the dynamic entry data structure 720 associated with the particular shareable object is also written to the read only memory 780. Typically, the writable portion is at the end of the read only memory 780. Thus, allowing shareable objects to be added as needed. Processing continues at block 608.

At block 608, the dynamic entry associated with the shareable object is copied to the writable section of the read only memory 780. Processing continues at block 610

At block 610, the write-able portion of the read only memory 780 in which the shareable object is written is set as read only. Because the shareable objects are written into read only memory, any attempt to modify the shareable objects results in an exception and is, thereby, prevented. Processing continues at block 612.

At block 612, the shareable map 770 and the shareable table 710 are updated. The shareable table 710 is associated with the local module that is responsible for creating the shareable object. Thus, the entry in the shareable table 710 associated with the particular shareable object is updated to point to the shareable dynamic entry within the read only memory instead of to the dynamic entry data structure 720. The shareable map 770 allows any module to identify a shareable object based on a unique id assigned to the shareable object. Thus, a unique id is generated using conventional methods and is associated with the shareable object. The shareable map 770 includes two entries for each shareable object: a unique identifier 772 and a shareable dynamic entry reference 774. The shareable dynamic entry reference identifies a location within the read only memory for the particular shareable object. The shareable map 770 may be sorted by the unique identifier 772 in order to allow binary searching capabilities. The shareable map 770 may also include flags (not shown) for maintaining the state for each shareable object and a size parameter for recording the shape of the datablob for each shareable object. Processing continues at block 614.

At block 614, access to the shareable object within the heap 764 is unlocked. After block 614, the garbage collection process may collect the memory storing the shareable object because it is no longer needed. The persisted read-only memory is registered with the garbage collector in order to avoid garbage collection. By registering the read-only memory, the garbage collector becomes aware of the address range for the read-only memory and ignores that address range in as efficient manner as possible. The garbage collector may, in the interest of handling memory in a similar manner for speed purposes, choose to create some of its supporting data structures (e.g., card table, brick table, and the like) to cover the address range. Processing is then complete.

FIG. 7 is a graphical depiction of salient portions of memory for creating shareable objects in accordance with the present shareable data mechanism. While most of the data structures within FIG. 7 have been described in conjunction with the above flow diagrams, the following describes the flows with specific reference to the data structures shown in FIG. 7.

When the IL module is loaded, a local module data structure 702 is created that includes entries associated with the IL module. Each application domain has its own local module data structure 702 for each IL module that is loaded. Thus, typically, there are several local module data structures 702 associated with each application domain. One entry (e.g., pDataBlob) in the local module data structure 702 references a data blob for storing static objects using conventional techniques. Because the data structures associated with the conventional techniques are not pertinent to the description of the present shareable data mechanism, the data structures have been omitted for clarity.

However, another entry (e.g., pShareableTable) in the local module data structure 702 is pertinent to the present shareable data mechanism. The entry points to a shareable object table 710. The shareable object table 710 includes an entry for each shareable class defined within the associated IL module. When the associated IL module is loaded, the IL module is interrogated to determine the number of shareable classes as described above. The shareable object table 710 is then created based on the number of identified shareable classes. Each entry is set to null to indicate that the associated shareable class has not yet been populated. Each entry in the shareable object table 710 becomes populated when the associated shareable class is accessed. Therefore, in the pre-JIT compilation process 300, each entry becomes populated during process 300. However, during the JIT compilation process 400, only the entries of shareable classes that are accessed become populated.

The entry is populated by storing a pointer to a dynamic entry data structure 720 associated with the shareable class.

The constructor of the shareable class then populates the primitive storage and the gc handle as described above. In general, the constructor stores non-garbage collectible members of the shareable class in the primitive storage and the garbage collectible members in the object array 730 referenced by the gc handle. Thus, each static member is placed on the gc heap 760 before making the shareable class shareable.

The shareable class is made shareable by deep copying the object array 730 to the read only section 780 as described in FIG. 5. In addition, the dynamic entry data structure 720 and the actual objects on the heap (e.g., objects 762 and 764) are copied to the read only section 780. Once this copy is completed, the entry associated with the shareable class in the shareable map 770 is updated to reference the shareable dynamic entry in the read only section 780. Likewise, the entry associated with the shareable class in the shareable table 710 is updated to reference the shareable dynamic entry in the read only section 780 rather than the dynamic entry 720. The dynamic entry 720, object array 730, and the objects on the heap 762 and 764 may then be garbage collected in the conventional manner.

As mentioned above, in the pre-JIT process, each of the shareable classes are processed. Therefore, after the pre-JIT process, each entry in the shareable map 700 is populated to reference its corresponding shareable object in the read only section 780. The read only section 780 and the shareable map 770 are then persisted with the native image.

Thus, when another application domain loads the same IL module, assuming that the IL module was pre-JITTed in another application domain, when the IL module loads, the shareable map 770 and the read only section 780 are populated. Thus, the local operating system can map the shareable objects directly into memory for multiple processes. During runtime, when the other application domain attempts to access one of the shareable classes, the process first checks its own copy of the shareable table 710 and then the shareable map 770 to see whether the shareable class has already been created or shared. If the entry associated with the shareable class is not null in the shareable table 710, the reference within the entry is used to obtain the shareable objects. However, assuming the entry associated with the shareable class is null in the shareable table, the entry in the shareable map 770 is checked. If the entry associated with the shareable class is not null in the shareable map 770, the contents of the entry (i.e., pointer to the shareable object) is stored in the associated entry in the shareable table 710 for this new application domain. The new application domain may then access the pointer in the read only section 780 without executing the constructor and re-creating all of the shareable objects. Thus, any managed application in a different application domain within the same process can access the shared object without re-executing the constructor. In addition, if the IL module has been pre-JITed, any managed application in a different application domain within a different process may access the shared object without re-executing the constructor.

In the described embodiment, many of the data structures and the processing are used and operated in a similar manner between the pre-JIT compilation process and the JIT complication process. While this is convenient, it not necessary. It is envisioned that some implementations of the present shareable data mechanism may have more significant differences between the pre-JIT compilation and the JIT complication processes.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have either not been shown or have not been described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A method comprising:
    compiling a central processing unit (cpu)-independent file to create executable instructions associated with an application, the application being executable in a virtual runtime environment;
    executing a constructor during creation of the executable instructions, the constructor being associated with a shareable class defined within the cpu-independent file and being configured to create a plurality of shareable objects associated with the shareable class;
    creating a dynamic entry structure for the plurality of shareable objects associated with the shareable class, the dynamic entry structure including a storage that contains non-garbage collectable static members and a garbage collection handle that references an object array data structure that contains garbage collectable static members; and
    persisting, based at least in part on the dynamic entry structure and the object array data structure, shareable object information associated with the plurality of shareable objects by populating the storage with the non-garbage collectable static members and populating the garbage collection handle with references to the object array data structure for the garbage collectable static members, the persisted shareable object information being associated with the plurality of shareable objects available to each application to execute in a common virtual runtime environment.

2. The method of claim 1, wherein compiling is performed by a just-in-time compiler.

3. The method of claim 2, wherein persisting the shareable object information further comprises copying the plurality of shareable objects from a heap to a restricted memory area.

4. The method of claim 3, wherein the restricted memory area is designated as a read only memory area.

5. The method of claim 3, further comprising locking the plurality of shareable objects before copying and unlocking the plurality of shareable objects once the shareable object information is copied.

6. The method of claim 1, wherein compiling is performed by a pre-JIT compiler.

7. The method of claim 6, wherein the pre-JIT compiler outputs a native image after compiling the cpu-independent file, the native image being compatible with a local operating system.

8. The method of claim 7, wherein the shareable object information is stored in a file associated with the native image.

9. The method of claim 1, further comprising verifying that each shareable object is safe to share before persisting the sharable object information associated with the plurality of shareable objects.

10. The method of claim 1, wherein the constructor is executed under security restrictions that do not allow access to changeable information when generating static data for static members of the plurality of shareable objects.

11. The method of claim 1, further comprising:
updating a first entry in a shareable object table to reference the dynamic entry structure;
creating respective entries within the object array data structure for each of the shareable objects that are garbage collectible members, the respective entries identifying a location for the respective shareable objects within a heap; and
populating the heap during execution of the constructor.

12. A computer-readable storage medium having stored computer-executable instructions for performing operations comprising:
compiling a central processing unit (cpu)-independent file to create executable instructions associated with an application, the application being executable in a virtual runtime environment;
executing a constructor during creation of the executable instructions, the constructor being associated with a shareable class defined within the cpu-independent file and being configured to create a plurality of shareable objects associated with the shareable class;
creating a dynamic entry structure associated with the shareable class, the dynamic entry structure including a storage that contains non-garbage collectable static members and a garbage collection handle that references an object array data structure that contains garbage collectable static members;
creating respective entries within the object array data structure for the garbage collectable static members, each entry identifying a location for the respective garbage collectable static member within a heap; and
sharing, based at least in part on the dynamic entry structure and the object array data structure, the plurality of shareable objects with other applications executing in the virtual runtime environment, the virtual runtime environment being common to the application and the other applications.

13. The computer-readable storage medium of claim 12, further comprising verifying that each shareable object is safe to share before sharing the object.

14. The computer-readable storage medium of claim 13, wherein the constructor is executed under security restrictions that do not allow access to changeable information when generating static data for static members of the plurality of shareable objects.

15. The computer-readable storage medium of claim 12, further comprising:
updating an entry in a shareable object table to reference the dynamic entry structure; and
populating the object array and the heap during execution of the constructor.

16. The computer-readable storage medium of claim 12, wherein sharing a sharable object comprises:
locking access to the shareable object;
deep copying the shareable object stored on a heap to a writable portion of a read only memory;
copying a dynamic entry referencing a location for the shareable object to the writable portion of the read only memory;
setting the writable portion to read only;
updating an entry in a shareable ID map to point to the shareable object within the read only memory;
updating the entry in the shareable table to point to the shareable object within the read only memory; and
unlocking access to the shareable object.

17. A system comprising:
one or more processors; and
a memory into which a plurality of instructions are loaded, the plurality of instructions, when executed by the one or more processors, performing operations comprising:
compiling a central processing unit (cpu)-independent file to create executable instructions associated with an application, the application being executable in a virtual runtime environment;
executing a constructor during creation of the executable instructions, the constructor being associated with a shareable class defined within the cpu-independent file and being configured to create a plurality of shareable objects associated with the shareable class;
creating a dynamic entry structure and an object array data structure for the plurality of shareable objects associated with the shareable class, wherein the constructor stores non-garbage collectible members in a storage of the dynamic entry structure and stores garbage collectible members in the object array data structure; and
persisting, based at least in part on the dynamic entry structure and the object array data structure, shareable object information associated with the plurality of shareable objects by populating the storage with the non-garbage collectable members and populating a garbage collection handle with references to the object array data structure for the garbage collectable members in a manner that allows other applications, executing in a virtual runtime environment common to the virtual runtime environment that the application is executable in, to access the plurality of shareable objects.

18. The system of claim 17, wherein the compiling is performed by a just-in-time compiler.

19. The system of claim 17, wherein persisting the shareable object information comprises copying the plurality of shareable objects from a heap to a restricted memory area.

20. The system of claim 19, wherein the restricted memory area is designated as a read only memory area.

* * * * *